(12) United States Patent
Johnson

(10) Patent No.: US 6,609,673 B1
(45) Date of Patent: Aug. 26, 2003

(54) FISHING LINE FEEDING DEVICE FOR A FISHING POLE

(76) Inventor: Martin D. Johnson, 2322 Washington Ave., Bedford, IN (US) 47421

( * ) Notice: Subject to any disclaimer, the term of this patent is extended or adjusted under 35 U.S.C. 154(b) by 87 days.

(21) Appl. No.: 09/960,056

(22) Filed: Sep. 21, 2001

(51) Int. Cl.⁷ .................. B65H 49/26; B65H 59/04; A01K 87/00
(52) U.S. Cl. .................. 242/423.1; 242/404.2; 242/404.3; 242/902; 43/25
(58) Field of Search .................. 242/902, 423.1, 242/404.2, 404.3, 129.7, 129.72; 43/25

(56) References Cited

U.S. PATENT DOCUMENTS

| | | | | |
|---|---|---|---|---|
| 2,550,275 A | * | 4/1951 | Leiding | 242/902 |
| 3,261,569 A | | 7/1966 | Bedell | |
| 3,399,847 A | | 9/1968 | Slate | |
| 3,679,151 A | * | 7/1972 | Rice | 242/902 |
| 3,776,485 A | * | 12/1973 | Foley et al. | 242/902 |
| 3,957,224 A | | 5/1976 | Smith | |
| 3,973,741 A | * | 8/1976 | Dean | 242/902 |
| 4,787,168 A | * | 11/1988 | Benit et al. | 242/902 |
| D300,405 S | | 3/1989 | Kuntze et al. | |
| 4,922,644 A | * | 5/1990 | Sherbondy | 242/902 |
| 5,029,409 A | * | 7/1991 | Nouwens | 242/902 |
| 5,218,779 A | * | 6/1993 | Morgan et al. | 242/902 |
| 5,375,788 A | | 12/1994 | English | |
| 5,513,463 A | | 5/1996 | Drinkwater | |
| 5,794,883 A | * | 8/1998 | MacEwen | 242/902 |
| 5,839,687 A | * | 11/1998 | Magnafici | 242/902 |

* cited by examiner

Primary Examiner—John M. Jillions

(57) ABSTRACT

A fishing line feeding device for a fishing pole for easily transferring fishing line from a spool to a reel. The fishing line feeding device for a fishing pole includes a support member having a tongue portion and an elongate cross portion being attached to a top end of the tongue portion with the support member being removably supported upon a portion of the fishing pole and; and also includes lug members being spaced apart and being securely attached to the elongate cross portion for facilitating mounting of the fishing line feeding device upon the fishing pole; and further includes a spool support assembly including a shaft being securely attached to the tongue portion for supporting a spool; and also includes a fishing line handling assembly being securely attached to the lug members.

12 Claims, 3 Drawing Sheets

FISHING LINE FEEDING DEVICE FOR A FISHING POLE

BACKGROUND OF THE INVENTION

1. Field of the Invention

The present invention relates to a fishing line feeder and more particularly pertains to a new fishing line feeding device for a fishing pole for easily transferring fishing line from a spool to a reel.

2. Description of the Prior Art

The use of a fishing line feeder is known in the prior art. More specifically, a fishing line feeder heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,513,463; 3,957,224; 5,375,788; 3,399,847; 3,261,569; and U.S. Pat. No. Des. 300,405.

While these devices fulfill their respective, particular objectives and requirements, the aforementioned patents do not disclose a new fishing line feeding device for a fishing pole. The inventive device includes a support member having a tongue portion and an elongate cross portion being attached to a top end of the tongue portion with the support member being removably supported upon a portion of the fishing pole and; and also includes lug members being spaced apart and being securely attached to the elongate cross portion for facilitating mounting of the fishing line feeding device upon the fishing pole; and further includes a spool support assembly including a shaft being securely attached to the tongue portion for supporting a spool; and also includes a fishing line handling assembly being securely attached to the lug members.

In these respects, the fishing line feeding device for a fishing pole according to the present invention substantially departs from the conventional concepts and designs of the prior art, and in so doing provides an apparatus primarily developed for the purpose of easily transferring fishing line from a spool to a reel.

SUMMARY OF THE INVENTION

In view of the foregoing disadvantages inherent in the known types of fishing line feeder now present in the prior art, the present invention provides a new fishing line feeding device for a fishing pole construction wherein the same can be utilized for easily transferring fishing line from a spool to a reel.

The general purpose of the present invention, which will be described subsequently in greater detail, is to provide a new fishing line feeding device for a fishing pole which has many of the advantages of the fishing line feeder mentioned heretofore and many novel features that result in a new fishing line feeding device for a fishing pole which is not anticipated, rendered obvious, suggested, or even implied by any of the prior art fishing line feeder, either alone or in any combination thereof.

To attain this, the present invention generally comprises a support member having a tongue portion and an elongate cross portion being attached to a top end of the tongue portion with the support member being removably supported upon a portion of the fishing pole and; and also includes lug members being spaced apart and being securely attached to the elongate cross portion for facilitating mounting of the fishing line feeding device upon the fishing pole; and further includes a spool support assembly including a shaft being securely attached to the tongue portion for supporting a spool; and also includes a fishing line handling assembly being securely attached to the lug members.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and.of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new fishing line feeding device for a fishing pole which has many of the advantages of the fishing line feeder mentioned heretofore and many novel features that result in a new fishing line feeding device for a fishing pole which is not anticipated, rendered obvious, suggested, or even implied by any of the prior art fishing line feeder, either alone or in any combination thereof.

It is another object of the present invention to provide a new fishing line feeding device for a fishing pole which may be easily and efficiently manufactured and marketed.

It is a further object of the present invention to provide a new fishing line feeding device for a fishing pole which is of a durable and reliable construction.

An even further object of the present invention is to provide a new fishing line feeding device for a fishing pole which is susceptible of a low cost of manufacture with regard to both materials and labor, and which accordingly is then susceptible of low prices of sale to the consuming public, thereby making such fishing line feeding device for a fishing pole economically available to the buying public.

Still yet another object of the present invention is to provide a new fishing line feeding device for a fishing pole which provides in the apparatuses and methods of the prior art some of the advantages thereof, while simultaneously overcoming some of the disadvantages normally associated therewith.

Still another object of the present invention is to provide a new fishing line feeding device for a fishing pole for easily transferring fishing line from a spool to a reel.

Yet another object of the present invention is to provide a new fishing line feeding device for a fishing pole which includes a support member having a tongue portion and an elongate cross portion being attached to a top end of the tongue portion with the support member being removably supported upon a portion of the fishing pole and; and also includes lug members being spaced apart and being securely attached to the elongate cross portion for facilitating mounting of the fishing line feeding device upon the fishing pole; and further includes a spool support assembly including a shaft being securely attached to the tongue portion for supporting a spool; and also includes a fishing line handling assembly being securely attached to the lug members.

Still yet another object of the present invention is to provide a new fishing line feeding device for a fishing pole that essentially eliminates the fishing line from getting tangled as the fishing line is being moved to the reel.

Even still another object of the present invention is to provide a new fishing line feeding device for a fishing pole that allows just one person to easily and conveniently load a reel with fishing line.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
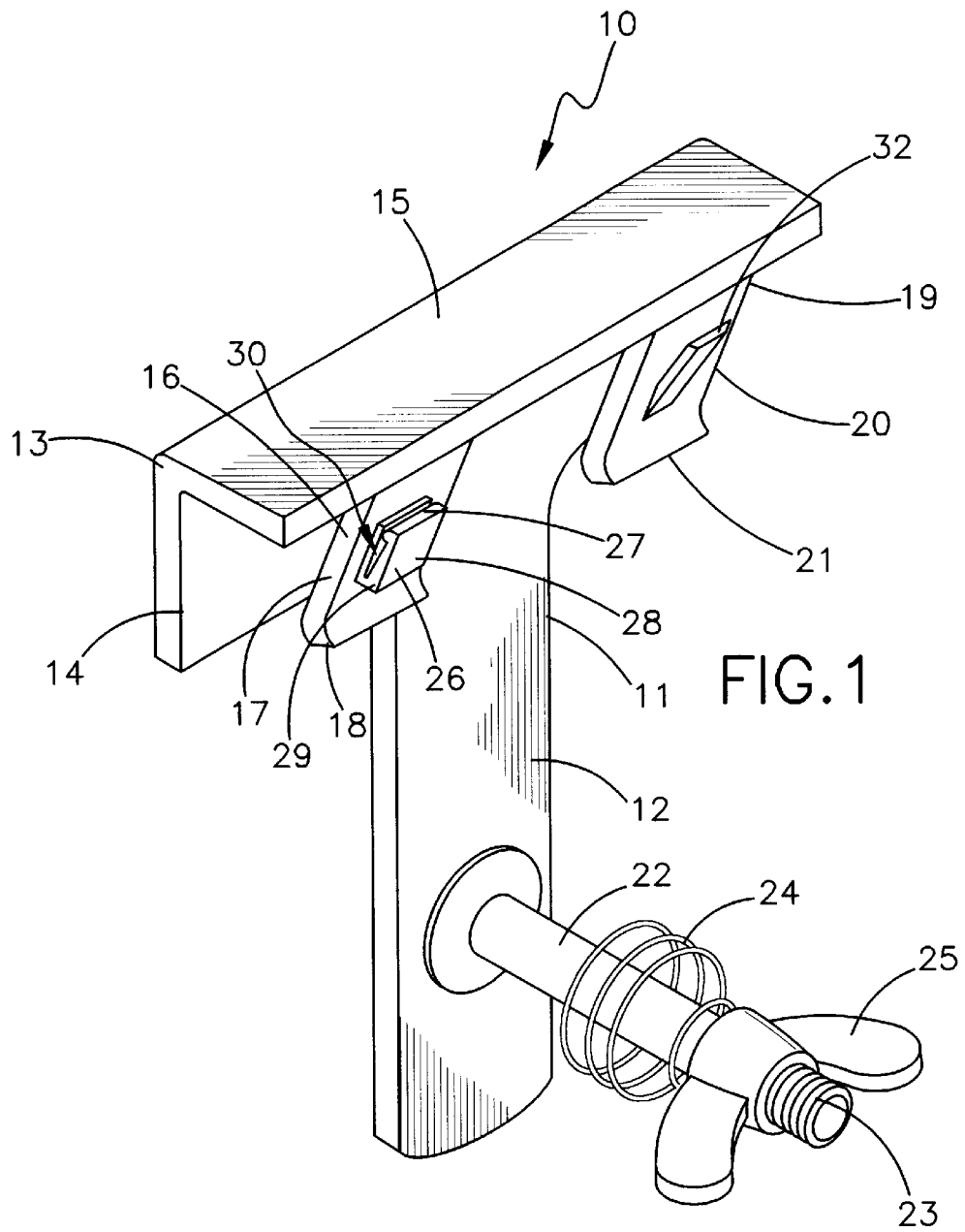
FIG. 1 is a perspective view of a new fishing line feeding device for a fishing pole according to the present invention.
Figure 2:
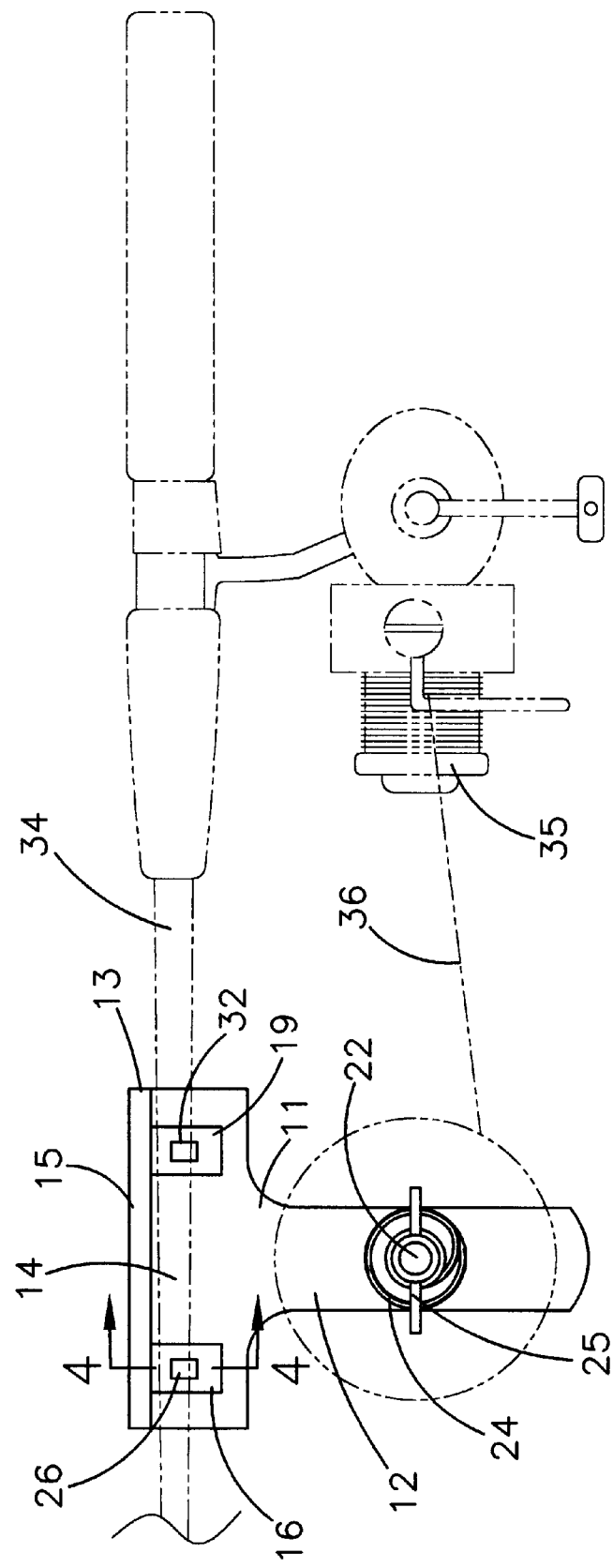
FIG. 2 is a front elevational view of the present invention shown in use.
Figure 3:
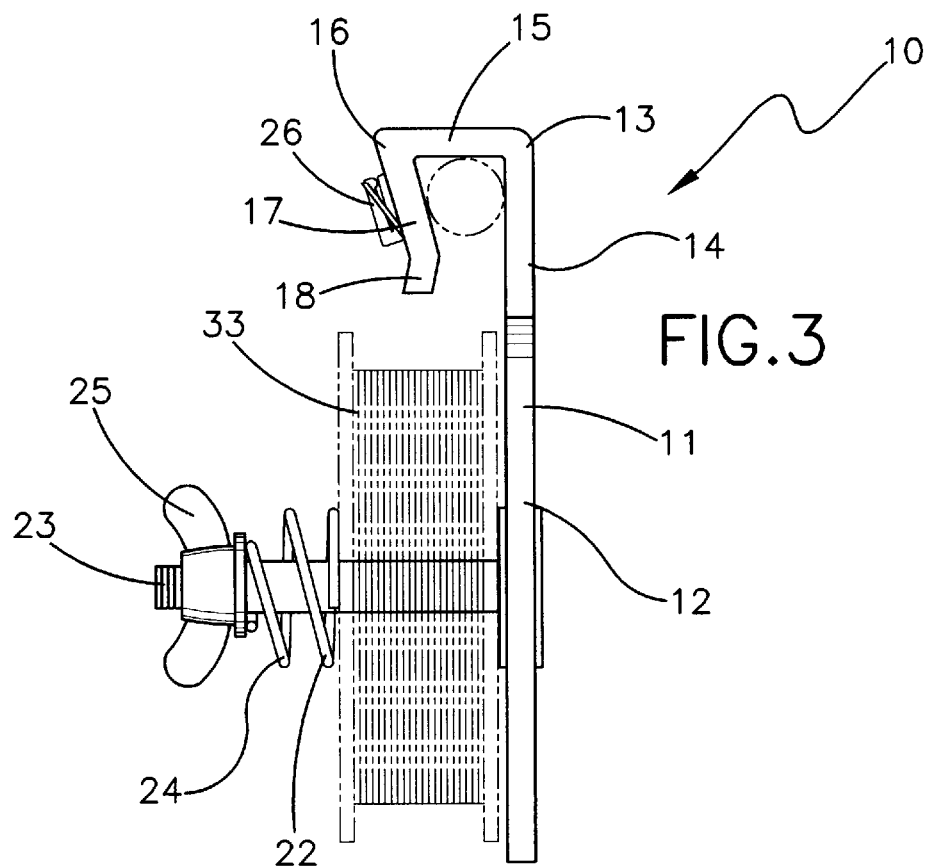
FIG. 3 is a side elevational view of the present invention.
Figure 4:
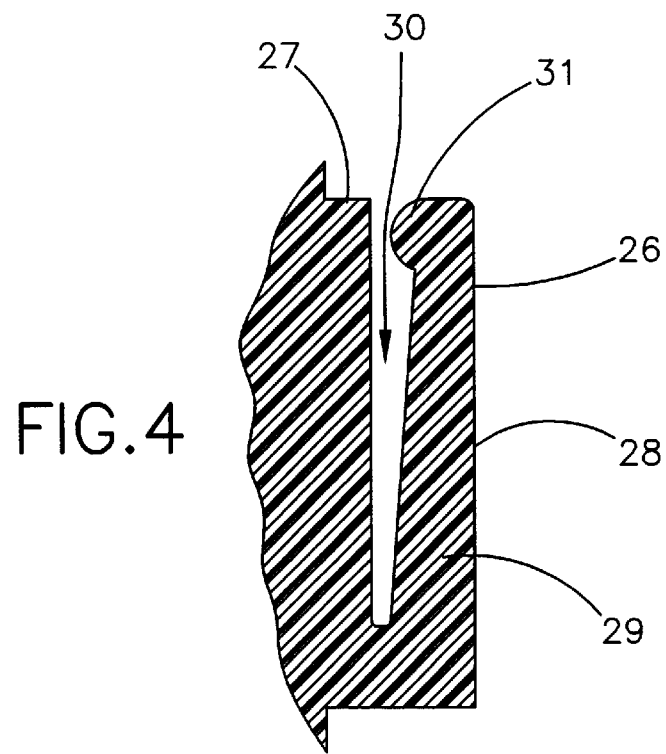
FIG. 4 is a cross-sectional view of the fishing line holder of the present invention.

With reference now to the drawings, and in particular to FIGS. 1 through 4 thereof, a new fishing line feeding device for a fishing pole embodying the principles and concepts of the present invention and generally designated by the reference numeral 10 will be described.

As best illustrated in FIGS. 1 through 4, the fishing line feeding device for a fishing pole 10 generally comprises a support member 11 having a tongue portion 12 and an elongate cross portion 13 being integrally attached to a top end of the tongue portion 12. The support member 11 is removably supported upon a portion of the fishing pole 34. The elongate cross portion 13 includes a first longitudinal side portion 14 which is integrally attached to the tongue portion 12, and also includes a second longitudinal side portion 15 which is longitudinally angled relative to the first longitudinal side portion 14 and to the tongue portion 12.

Lug members 16,19 are spaced apart and are securely and conventionally attached to the elongate cross portion 13 for facilitating mounting of the fishing line feeding device 10 upon the fishing pole 34. The lug members 16,19 extend from a longitudinal edge of the second longitudinal side portion 15 and are spaced from the first longitudinal side portion 14 for removably receiving a portion of the fishing pole 34 therebetween. Each of the lug members 16,19 includes a main portion 17,20 which is angled toward the first longitudinal side portion 14 and also includes an end portion 18,21 which is angled away from the first longitudinal side portion 14.

A spool support assembly includes a shaft 22 being securely and conventionally attached to the tongue portion 12 for supporting a spool 33. The shaft 22 extends generally perpendicular to the tongue portion 12 and has a threaded end portion 23. The spool support assembly also includes a spring member 24 being supported upon the shaft 22 for providing tension to the spool 33 mounted upon the shaft 22, and further includes a fastening member 24 being threaded upon the threaded end portion 23 of the shaft 22 for holding the spool 33 upon the shaft 22. The spring member 24 is adapted to be biased between the fastening member 25 and the spool 33.

A fishing line handling assembly is securely and conventionally attached and welded to the lug members 16,19. The fishing line handling assembly includes a fishing line holder 26 being securely and conventionally attached to an outer side of one of the lug members 16 and has a front wall 28, a top wall 27, side walls 29, and a slot 30 being disposed therein through the top wall 27 and side walls 29 and is adapted to receive a fishing line 36 therein. The fishing line handling assembly also includes a fishing line cutting member 32 being securely and conventionally attached to an outer side of the other of the lug members 19 for cutting the fishing line 36. The fishing line holder 26 is generally a clip member. The slot 30 in the fishing line holder 26 is tapered downwardly to accommodate different sizes of fishing lines 36. The clip member 26 also has a node 31 being conventionally attached to near a top of a wall forming the slot 30 therein and is adapted to aid in retaining the fishing line 36 in the slot 30.

In use, the user places the fishing pole 34 between the lug members 16,19 and the first longitudinal side portion 14, and then strings the fishing line 36 from the spool 33 through the fishing line holder 26 and the fishing line cutting member 32 to the reel 35 so that the fishing line 36 can be taken up by the reel 35.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fishing line feeding device for a fishing pole comprising:
   a support member having a tongue portion and an elongate cross portion being attached to a top end of said tongue portion, said support member being removably supported upon a portion of the fishing pole and;
   lug members being spaced apart and being securely attached to said elongate cross portion for facilitating mounting of said fishing line feeding device upon the fishing pole;
   a spool support assembly including a shaft being securely attached to said tongue portion for supporting a spool; and
   a fishing line handling assembly being securely attached to said lug members.

2. A fishing line feeding device for a fishing pole as described in claim 1, wherein said elongate cross portion includes a first longitudinal side portion which is integrally attached to said tongue portion, and also includes a second longitudinal side portion which is longitudinally angled relative to said first longitudinal side portion and to said tongue portion.

3. A fishing line feeding device for a fishing pole as described in claim 2, wherein said lug members extend from a longitudinal edge of said second longitudinal side portion and are spaced from said first longitudinal side portion for removably receiving a portion of the fishing pole therebetween.

4. A fishing line feeding device for a fishing pole as described in claim 3, wherein each of said lug members includes a main portion which is angled toward said first longitudinal side portion and also includes an end portion which is angled away from said first longitudinal side portion.

5. A fishing line feeding device for a fishing pole as described in claim 4, wherein said shaft extends generally perpendicular to said tongue portion and has a threaded end portion.

6. A fishing line feeding device for a fishing pole as described in claim 5, wherein said spool support assembly also includes a spring member being supported upon said shaft for providing tension to a spool mounted upon said shaft, and further includes a fastening member being threaded upon said threaded end portion of said shaft for holding the spool upon said shaft.

7. A fishing line feeding device for a fishing pole as described in claim 6, wherein said spring member is adapted to be biased between said fastening member and the spool.

8. A fishing line feeding device for a fishing pole as described in claim 7, wherein said fishing line handling assembly includes a fishing line holder being securely attached to an outer side of one of said lug members and having a front wall, a top wall, side walls, and a slot being disposed therein through said top and side walls and being adapted to receive a fishing line therein, said fishing line handling assembly also including fishing line cutting member being securely attached to an outer side of the other of said lug members for cutting the fishing line.

9. A fishing line feeding device for a fishing pole as described in claim 8, wherein said fishing line holder is generally a clip member.

10. A fishing line feeding device for a fishing pole as described in claim 9, wherein slot in said fishing line holder is tapered downwardly to accommodate different sizes of fishing lines.

11. A fishing line feeding device for a fishing pole as described in claim 10, wherein said clip member also has a node being attached to near a top of a wall forming said slot therein and being adapted to aid in retaining the fishing line in said slot.

12. A fishing line feeding device for a fishing pole comprising:
   a support member having a tongue portion and an elongate cross portion being attached to a top end of said tongue portion, said support member being removably supported upon a portion of the fishing pole, said elongate cross portion including a first longitudinal side portion which is integrally attached to said tongue portion, and also including a second longitudinal side portion which is longitudinally angled relative to said first longitudinal side portion and to said tongue portion;
   lug members being spaced apart and being securely attached to said elongate cross portion for facilitating mounting of said fishing line feeding device upon the fishing pole, said lug members extending from a longitudinal edge of said second longitudinal side portion and being spaced from said first longitudinal side portion for removably receiving a portion of the fishing pole therebetween, each of the lug members including a main portion which is angled toward said first longitudinal side portion and also including an end portion which is angled away from said first longitudinal side portion;
   a spool support assembly including a shaft being securely attached to said tongue portion for supporting a spool, said shaft extending generally perpendicular to said tongue portion and having a threaded end portion, said spool support assembly also including a spring member being supported upon said shaft for providing tension to a spool mounted upon said shaft, and further including a fastening member being threaded upon said threaded end portion of said shaft for holding the spool upon said shaft, said spring member being adapted to be biased between said fastening member and the spool; and
   a fishing line handling assembly being securely attached to said lug members, said fishing line handling assembly including a fishing line holder being securely attached to an outer side of one of said lug members and having a front wall, a top wall, side walls, and a slot being disposed therein through said top and side walls and being adapted to receive a fishing line therein, said fishing line handling assembly also including fishing line cutting member being securely attached to an outer side of the other of said lug members for cutting the fishing line, said fishing line holder being generally a clip member, slot in said fishing line holder being tapered downwardly to accommodate different sizes of fishing lines, said clip member also having a node being attached to near a top of a wall forming said slot therein and being adapted to aid in retaining the fishing line in said slot.

\* \* \* \* \*